May 14, 1968 V. L. WESTBAY 3,382,516
METHOD FOR MAKING NUTS
Filed Aug. 25, 1965 2 Sheets-Sheet 1
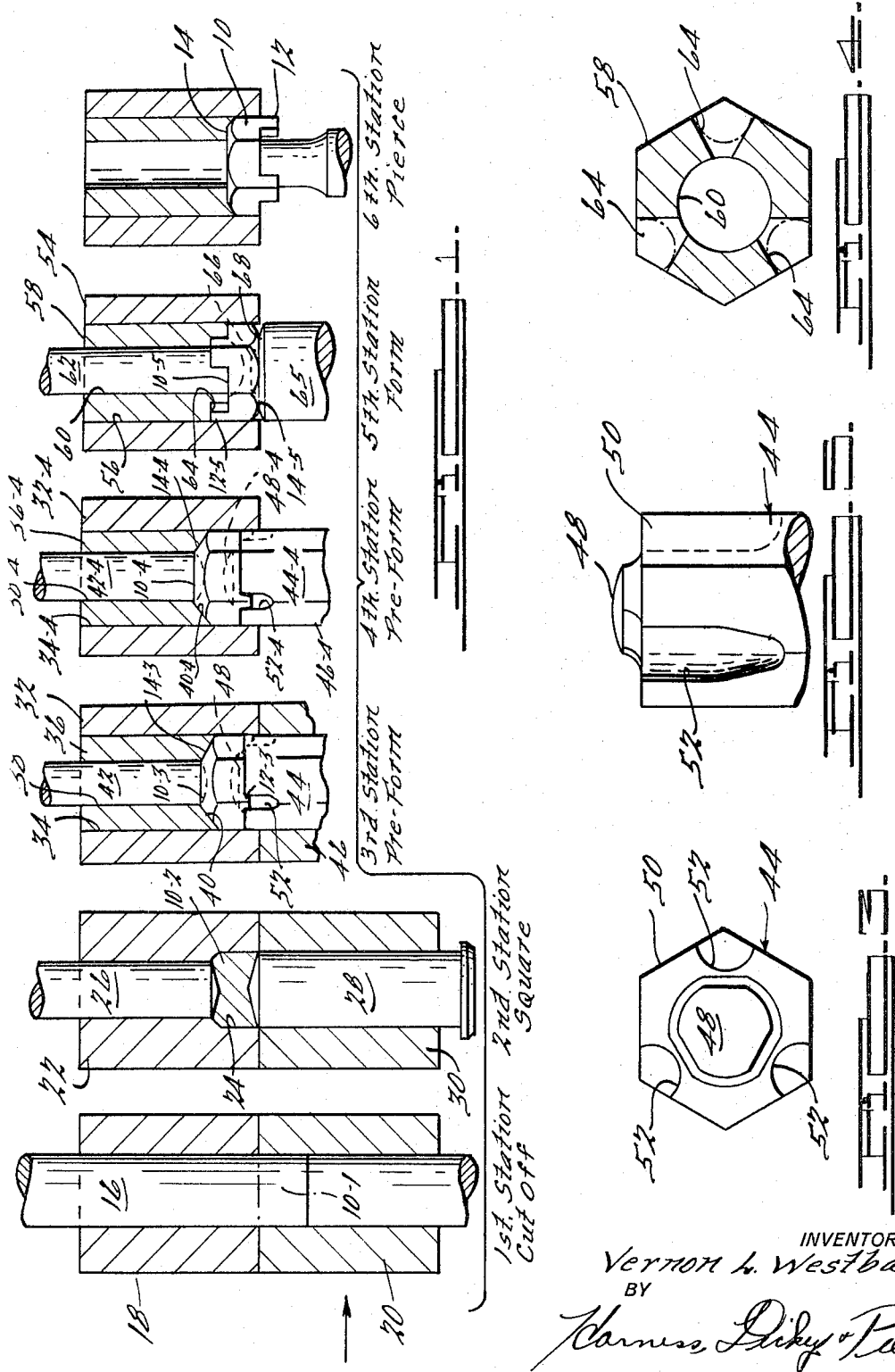
INVENTOR.
Vernon L. Westbay
BY
Harness, Dickey & Pierce
ATTORNEYS.

May 14, 1968  V. L. WESTBAY  3,382,516
METHOD FOR MAKING NUTS
Filed Aug. 25, 1965  2 Sheets-Sheet 2
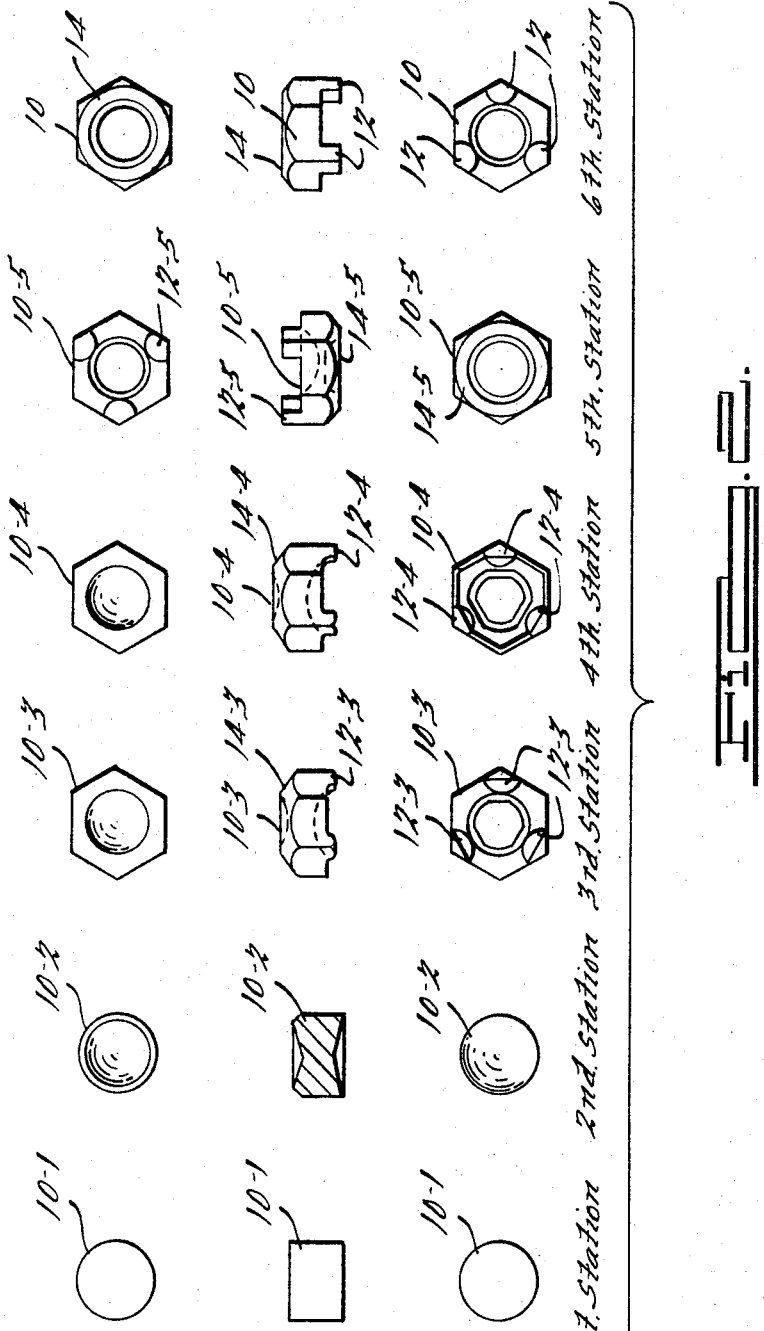
INVENTOR.
Vernon L. Westbay
BY
Harness, Dickey & Pierce
ATTORNEYS.

United States Patent Office 3,382,516
Patented May 14, 1968

3,382,516
METHOD FOR MAKING NUTS
Vernon L. Westbay, Detroit, Mich., assignor to Zimmer-Lightbody Industries, Inc., Detroit, Mich., a corporation of Michigan
Filed Aug. 25, 1965, Ser. No. 482,534
8 Claims. (Cl. 10—86)

ABSTRACT OF THE DISCLOSURE

A method of making castellated nuts including indenting the center of a blank in a lobed pattern.

---

The present invention relates to a method for making nuts and more specifically to a method for making castellated nuts.

The castellated or slotted nut has heretofore been made by machining out the slots. This results in a waste of material and requires the use of a large initial blank. In the present invention the slotted nut is made solely, except for tapping, on a header. Therefore, it is an object of the present invention to provide a novel method for manufacturing slotted nuts.

It is another object to provide a novel method for manufacturing slotted nuts on a header.

It is still another object to provide a novel and inexpensive method for manufacturing castellated nuts in which the amount of scrap or waste is reduced.

Other objects, features, and advantages of the present invention will become apparent from the subsequent description and the appended claims, taken in conjunction with the accompanying drawings, in which:

FIGURE 1 is a view depicting the formation of a tri-slotted nut at various work stations of cold heading apparatus from cutoff, through four forming operations, and to piercing;

FIGURE 2 is a series of top, bottom and side elevational views of the tri-slotted nut at the various work stations shown in FIGURE 1;

FIGURE 3 is an enlarged top elevational view of the punch used at the third station, which view is similar to the top elevational view of the punch used at the fourth station;

FIGURE 4 is an enlarged bottom elevational view of the insert used at the fifth station; and FIGURE 5 is an enlarged side elevational view of the punch used at the third station, which view is similar to the side elevational view of the punch used at the fourth station.

The preferred form of the invention is shown relative to the manufacture of a hexagonal nut having three castellations and hence three slots (tri-slotted).

Looking now to FIGURES 1 and 2 at the 6th station, the final castellated nut form (prior to tapping) is shown and is generally indicated by the numeral 10. The nut 10 has three castles or upwardly extending projections 12 located at three alternate corners and extending from the front end of the nut 10. Note that the areas in between the castles or projections 12, and including the other corners, define through slots. The opposite side of the nut 10 is provided with a circular, flat bearing seat 14. It is important that the seat 14 be flat and extend continuously such as to provide a good bearing surface for engagement with an adjacent surface against which it is tightened. In the discussion which follows in describing the progressive formation of the nut 10 through the various stations 1–5, similar portions will be given the same numerical designation along with a numerical designation indicating that particular station; for example, at station 3 the nut will be designated as 10–3 and the castellations as 12–3, etc.

Looking now to the drawings, specifically to FIGURES 1 and 2, the first station is stock cutoff in which circular wire stock 16 is fed through a circular bore in a stationary die member 18 and will extend into a mating bore in a movable cutoff member 20; upon relative sliding movement of the member 20 a blank 10–1 will be cut off. The blank 10–1 is next transferred to the second station for a sizing operation.

The second station includes a stationary die member 22 having a circular bore terminating in a counterbore 24 which receives the blank 10–1. A knockout pin 26 extends through the bore in the stationary member 22 and has a conical tip portion to form a conical depression in the front of the nut blank 10–1. A punch 28 is movable within a bore in a guide member 30 and is likewise provided with a conical tip portion to engage the rear of the blank 10–1. Upon engagement of the blank 10–1 in the second station by the knockout pin 26 and the punch 28, a blank 10–2 is formed having conical indentations or depressions front and rear. The purpose of the second station is to square up or size the blank 10–1 into a form such as 10–2. Also the metal is moved from the center by the conical tips of the knockout pin 26 and punch 28, since the material in the center is not to be utilized and eventually will have to be removed to form the bore which will be tapped; hence this reduces the amount of scrap material. The blank 10–2 is then moved to the third station and, in being transferred, is rotated 180°, i.e., end-for-end.

The third station includes an outer die 32 which has a generally hexagonally shaped bore 34. An insert 36 is matably located in bore 34 and is provided with a circular bore 38 and terminates at its lower end in a frusto conically shaped surface 40. A knockout pin 42 having a generally circular cross section is located within the bore 38 and is provided with a conical tip portion. A punch 44 is slidably located within a bore of a guide member 46 and is of a shape to be described. In the third station, the blank 10–2, which was of a circular cross section, is formed now into a hexagonal shape and its rear surface is formed with a frusto-conical surface 14–3 as a result of engagement with the frusto-conical portion 40 and is also provided with a centrally depressed portion as a result of engagement with the conical tip of the knockout pin 42. At the same time at the forward end of the nut blank 10–3, as a result of engagement with the punch 44, the center portion is further depressed and castellations 12–3 are initially and to a limited extent, formed.

The punch 44 is shown in FIGURE 3 and has a tip portion 48 which is generally pointed and conical but rather than having a circular shape, is provided with a triangular or tri-lobed shape. The tip 48 is connected to a hexagonally shaped portion 50 which is provided with axially extending grooves or slots 52 to serve a purpose to be described. The tip 48 forms the central portion of the blank 10–3 while the hex portion 50 engages the forward, outer surface of the nut blank 10–3, with the material which is forced from the center and outer portions being moved partially into the slots 52 whereby castellations 12–3 are initially formed. The slots 52 are provided to accept any excess material and hence provide a means for accounting for differences in the quantity of material used in different ones of blanks 10–1.

Note that the triangular or tri-lobed tip 48 is caused to strike the blank 10–3 such that the lobes are located and extend toward those corners which are in between the corners containing the castellations 12–3. By striking the blank 10–2 with such a punch, good material flow is caused to occur with the material for the castellations 12–3 being obtained not only from the center but also from the areas into which the lobes of the tip 48 extend; hence the material for the castles 12–3 does not all come from those particular corners in which they appear. The result then is a blank 12–3 having a generally frusto-conical surface 14–3 at its rear surface and having a uniform shape with the castles 12–3 partially formed. It is also important that the material flow be uniform such that the frusto-conical portion 14–3 be smooth to facilitate the formation of this portion into the flat bearing surface 14. With the die structure, including the tri-lobed tip 48, good material flow is obtained and the castellations 12–3 are uniformly formed while the desired smooth, continuous frusto-conical portion 14–3 is formed. After the completion of the operation at the third station, the blank 10–3 is then moved straight across (without rotation) into the fourth station.

The fourth station is substantially identical to the third station and hence components in the fourth station similar to and serving similar functions to like components in the third station will be given the same numerical designation with the addition of –4. In the fourth station the conical tip 48–4 is caused to move further into the center of the blank 10–3 whereby the castles 12–3 are moved even further to define castles 12–4. Note that the punch 44–4 has its tip 48–4 of generally the same shape as the tip 48 and hence the tri-lobe structure previously described will have the same effect as previously noted, in causing good flow of metal whereby the frusto-conical surface 14–4 will be maintained smooth and uniform while extended castellations 12–4 are formed. The blank 10–4 is next moved to the fifth station.

At the fifth station the nut blank 10–4 is worked to substantially its final form and hence the frusto-conical surface 14–4 is flattened to provide the bearing seat 14–5 and the castellations 12–4 are finally formed into the shape of the castellations 12–5. The fifth station comprises a die 54 having a hexagonally shaped bore 56 and is provided with an insert 58 which matably fits within the bore 56 and which itself is provided with a circular bore 60 into which is located a knockout pin 62 having a generally circular section. Note that the blank 10–4 is rotated 180° (end-for-end) in being moved from the fourth to the fifth station. Thus the insert 58 is provided with a plurality of pockets 64 (see FIGURE 4) which receive the castellations 12–4. A punch member 65 is of a generally circular cross section and is provided with a generally flat tip 66 and a generally flat, circular, outer portion 68. The tip 66 is locatable generally within the center of the nut blank 10–5, while the flat circular portion 68 engages the frusto-conical portion 14–4 to flatten that portion whereby the flat bearing seat 14–5 is formed. At the same time the castles 12–4 are finally formed to castles 12–5 by engagement with the walls of the cavities 64 whereby the proper height and shape of the castles 12–5 is determined. Note that a slight extra clearance is provided within the cavity 64 which accounts for variations in the quantities of material in blank 10–1. Also note that as shown in the top view of FIGURE 2 at station 5 a chamfer is formed on the radially outer edge of the center indentation; the chamfer prevents the formation of a sharp edge around the center indentation (and hence around the eventually formed through bore) and also enhances the flow of material.

The blank 10–5 out of station 5 is generally in the final shape and is rotated 180° as it is located within the sixth station at which the center of the nut 10–5 is pierced to form the nut blank 10. The only step remaining then is the tapping of the bore in the nut blank 10. This finally formed nut blank 10 is provided with a flat bearing surface 14, and is provided with castles 12 which are of a proper, desired height and shape. Note then that the castellated nut 10 has been made substantially completely with heading apparatus and that very little material is wasted, i.e., being only that portion which is removed upon final piercing at the sixth station. Thus novel method and apparatus have been shown for making a castellated nut which is inexpensive and in which the amount of waste material has been reduced.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. The method of making castellated nuts from a solid blank comprising the steps of: generally conically indenting both front and back of the solid blank to form a sized blank, forming the sized blank into a six-sided blank and forming forwardly extending castles at alternate corners while indenting the center of the front side in a lobed pattern with a lobe extending between each adjacent pair of the castles to displace material from said center towards the sides and corners whereby the flow of material to the castles is facilitated and forming a continuous frusto-conical surface at the outer periphery of its back side, and flattening the frusto-conical surface into a flat, annular bearing surface and forming the castles to a preselected height and shape.

2. The method of making castellated nuts from a solid blank comprising the steps of: generally conically indenting both front and back of the solid blank to form a sized blank, forming the sized blank into a six-sided blank and forming forwardly extending castles at alternate corners while indenting the center of the front side in a lobed pattern with a lobe extending between each adjacent pair of the castles to displace material from said center towards the sides and corners whereby the flow of material to the castles is facilitated and forming a continuous frusto-conical surface at the outer periphery of its back side, flattening the frusto-conical surface into a flat, annular bearing surface and forming the castles to a preselected height and shape, and piercing the center of the blank to form a central bore and cutting threads in the central bore.

3. The method of making castellated nuts from a solid blank comprising the steps of: generally conically indenting both front and back of the solid blank to form a sized blank, forming in a generally confined volume the sized blank into a six-sided blank and forming in a generally unconfined volume forwardly extending castles at alternate corners while indenting the center of the front side in a lobed pattern with a lobe extending between each adjacent pair of the castles to displace material from said center towards the sides and corners whereby the flow of material to the castles is facilitated and forming a frusto-conical surface at the outer periphery of its back side, and in a generally confined volume flattening the frusto-conical surface into a flat, annular bearing surface and in a generally unconfined volume forming the castles.

4. The method of making castellated nuts from a solid blank comprising the steps of: forming the blank into a six-sided blank and forming forwardly extending castles at alternate corners while indenting the center of the front side in a lobed pattern with a lobe extending between each adjacent pair of the castles to displace material from said center towards the sides and corners whereby the flow of material to the castles is facilitated and forming a continuous frusto-conical surface at the outer periphery of its back side, and flattening the frusto-conical surface into a flat, annular bearing surface and forming the castles to a preselected height and shape.

5. The method of making castellated nuts from a solid blank comprising the steps of: forming the blank into a six-sided blank and forming forwardly extending castles at alternate corners while indenting the center of the front side in a lobed pattern with a lobe extending between each adjacent pair of the castles to displace material from said center towards the sides and corners whereby the flow of material to the castles is facilitated.

6. The method of making castellated nuts from a solid blank comprising the steps of: forming the blank into a multi-sided blank and forming forwardly extending castles at selected corners while indenting the center of the front side in a lobed pattern with a lobe extending between adjacent ones of the castles to displace material from said center towards the sides and corners whereby the flow of material to the castles is facilitated.

7. The method of making castellated nuts from a solid blank comprising the steps of: forming the blank into a multi-sided blank and forming forwardly extending castles at selected alternate corners while indenting the center of the front side in a lobed pattern with a lobe extending between adjacent ones of the castles to displace material from said center towards the sides and corners whereby the flow of material to the castles is facilitated and forming a frusto-conical surface at the periphery of its back side, and flattening the frusto-conical surface into a flat, annular bearing surface and forming the castles to a preselected height and shape.

8. The method of making castellated nuts from a solid blank comprising the steps of: generally conically indenting both front and back of the solid blank to form a sized blank, forming the sized blank into a six-sided blank and forming forwardly extending castles at alternate corners while indenting the center of the front side in a lobed pattern with a lobe extending between adjacent ones of the castles to displace material from said center towards the sides and corners whereby the flow of material to the castles is facilitated and forming a frusto-conical surface at the periphery of its back side and further indenting the back side in a generally circular pattern, flattening the frusto-conical surface into a flat, annular bearing surface and forming the castles to a preselected height and shape and forming the lobed pattern into a generally circular pattern, piercing the center of the blank to form a central bore and forming threads in the central bore.

References Cited
UNITED STATES PATENTS

| | | | |
|---|---|---|---|
| 1,314,668 | 9/1919 | Jaques | 10—86 X |
| 2,016,296 | 10/1935 | Rosborough | 10—86 X |
| 2,074,678 | 3/1937 | Wilcox | 10—72.5 X |
| 2,436,342 | 2/1948 | Wilcox | 10—86 |

LEONIDAS VLACHOS, *Primary Examiner.*